United States Patent [19]

Conboy, Jr. et al.

[11] Patent Number: 4,781,014
[45] Date of Patent: Nov. 1, 1988

[54] CORD LINE MOWER

[76] Inventors: Charles E. Conboy, Jr., R R 1 Box 455, Kula, Hi. 96790; George Spector, 233 Broadway RM 3815, New York, N.Y. 10007

[21] Appl. No.: 51,278

[22] Filed: May 18, 1987

[51] Int. Cl.⁴ .................. A01D 34/67; A01D 34/73
[52] U.S. Cl. ........................... 56/12.7; 56/10.5
[58] Field of Search ..................... 56/10.5, 12.7

[56] References Cited

U.S. PATENT DOCUMENTS

| | | | |
|---|---|---|---|
| 3,928,911 | 12/1975 | Pittinger, Jr. | 56/12.7 |
| 4,077,191 | 3/1978 | Pittinger, Sr. et al. | 56/12.7 |
| 4,095,338 | 6/1978 | Naohito et al. | 56/12.7 |
| 4,118,864 | 10/1978 | Pittinger, Sr. et al. | 56/12.7 |
| 4,145,809 | 3/1979 | Proulx | 56/12.7 |
| 4,452,033 | 6/1984 | Scramuzza | 56/12.7 |

*Primary Examiner*—Paul J. Hirsch

[57] ABSTRACT

A cord line mower is provided and consists of the combination of a regular rotary mower with a cord line trimmer apparatus. A mechanism is included that can release extra cord line, as needed when the mower is in operation.

1 Claim, 1 Drawing Sheet

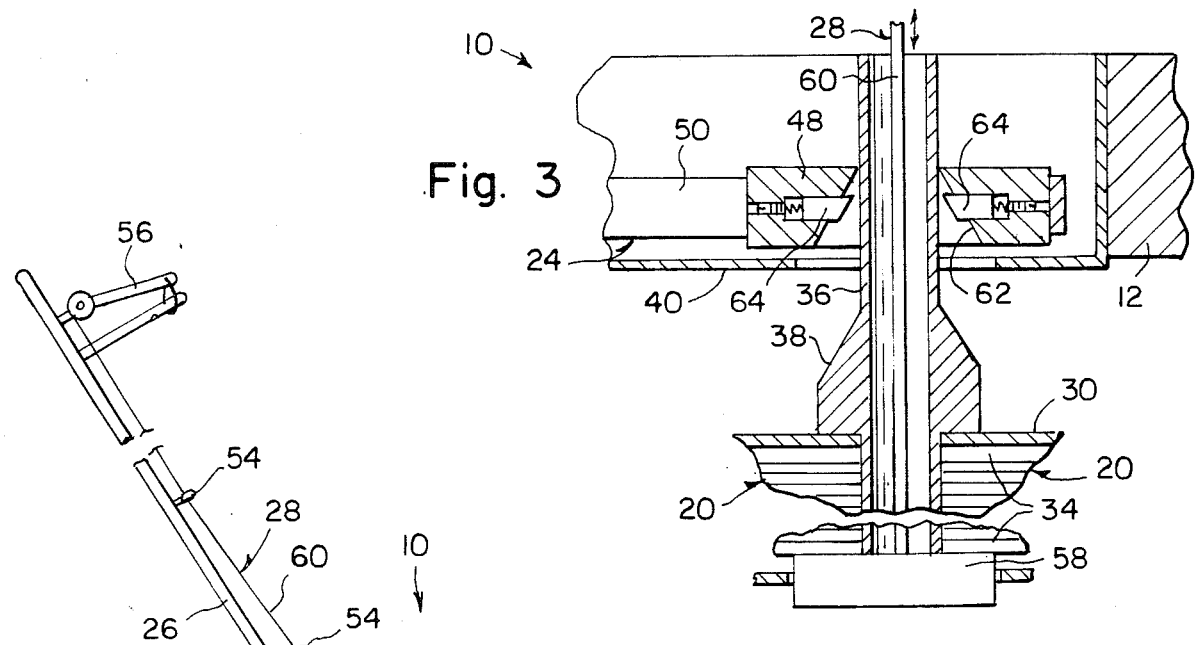
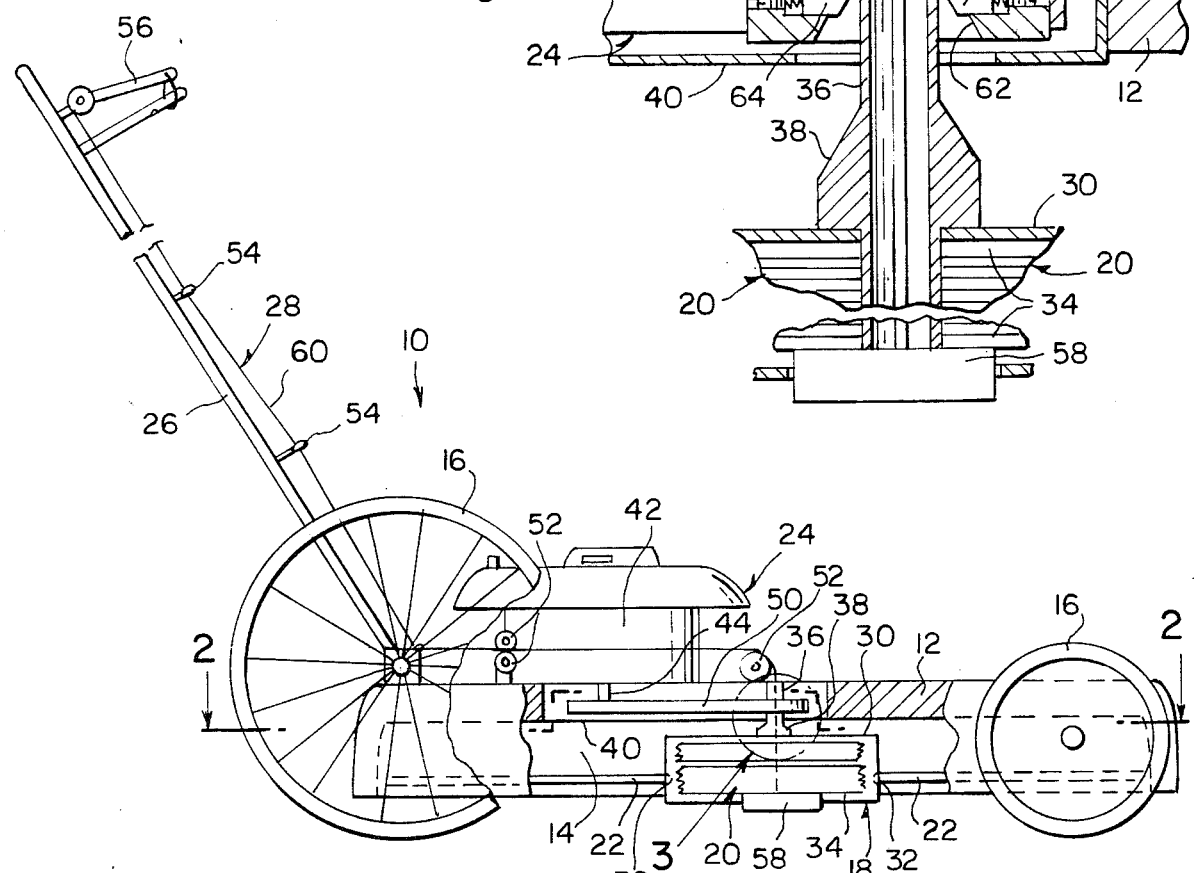
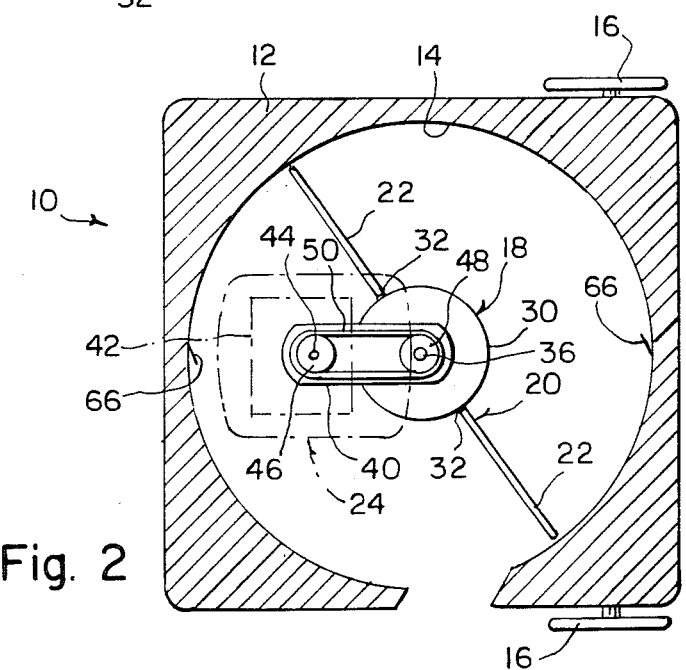

4,781,014

CORD LINE MOWER

BACKGROUND OF THE INVENTION

The instant invention relates generally to lawn mowers and more specifically it relates to a cord line mower.

Numerous lawn mowers have been provided in prior art that are adapted to utilize flexible non metallic filaments as cutting elements. For example U.S. Pat. Nos. 4,232,505; 4,250,623 and 4,452,033 all are illustrative of such prior art. While these units may be suitable for the purposes of the present invention as heretofore described.

SUMMARY OF THE INVENTION

A primary object of the present invention is to provide a cord line mower that will overcome the shortcomings of the prior art devices.

Another object is to provide a cord line mower that combines a regular rotary mower with a cord line trimmer apparatus so as to reduce the danger when operating the mower.

An additional object is to provide a cord line mower that can release extra cord line, as needed, when the mower is in operation.

A further object is to provide a cord line mower that is simple and easy to use.

A still further object is to provide a cord line mower that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of the invention with parts broken away.

FIG. 2 is a cross sectional view taken along line 2—2 in FIG. 1.

FIG. 3 is an enlarged cross sectional view as indicated by numeral 3 in FIG. 1 showing the clutch mechanism in the pulley to activate rotation of the cord line housing.

DETAILED DESCRIPTION OF THE PREFERRED EMBODIMENTS

Turning now descriptively to the drawings, in which similar reference characters denote similar elements throughout the several views, FIGS. 1 through 3 illustrate a cord line mower 10 consisting of a support housing 12 that has a hollow chamber 14 extending downwardly therefrom. A plurality of wheels 16 are mounted to the housing 12 to engagable movement of the housing 12 over a ground surface at a controlled height thereabove in a preformed direction. A spool assembly 18 is provided within the housing 12.

A flexible non metallic cord line cutting element 20 is wound repeatedly within the spool assembly 18. The cutting element 20 has two free unsupported lengths 22, each extending generally radially outward from an opposite side of the spool assembly 18 during driven rotation thereof. The free unsupported lengths 22 during cutting operations define a plane substantially perpendicular to axis of rotation of the spool assembly 18 to which the cutting element 20 is wound thereto.

A drive assembly 24 is for rotatably driving the spool assembly 18 at a speed sufficient to extend and stiffen the lengths 22 of the cutting element 20 to permit impact cutting of uncut grass particles thereby. A handle bar 26 is for manipulating the cord line mower 10. A mechanism 28 is also provided for lifting the spool assembly 18 into the drive assembly 24 for extending the unsupported lengths 22 of the cutting element 20 thus releasing extra lengths of the cutting element.

The spool assembly 18 includes a cord line housing 30 that has a pair of opposite side holes 32 therein. A spool 34 within the cord line housing 30 is for holding the cutting element 20. A hollow shaft 36 has an external bevel edge 38 therearound and the shaft 36 extends upwardly from the cord line housing 30.

The drive assembly 24 includes a casing 40 mounted into the support housing 12. A motor 42 is mounted on the support housing 12 in which the motor 42 has a vertical shaft 44 extending downwardly into the casing 40. A first pulley wheel 46 is connected to the vertical shaft 44 in the casing 40. A second pulley wheel 48 is rotatably mounted in the casing 40 around the hollow shaft 36 of the spool assembly 18. An endless belt 50 is placed around the first and second pulley wheels 46 and 48 so as to be driven by the motor 42.

The lifting mechanism 28 includes a plurality of rollers 52 mounted to top surface of the support housing 12. A plurality of eyelets 54 are mounted along the handle bar 26. A lever assembly 56 is mounted to upper portion of the handle bar 26. A spool lifter 58 is mounted to underside of the cord line housing 30 with an elongated cable 60 affixed at one end to the spool lifter 58 and extends upwardly through the hollow shaft 36 over the rollers 52 and through the eyelets 54 with other end affixed to the lever assembly 56.

The second pulley wheel 48 has a cone shaped hole 62 with a spring biased clutch 64 mechanism therein. When the lever assembly 56 is manually activated the spool lifter 58 will raise the cord line housing 30 in which the bevel edge 38 will engage with the clutch mechanism 64. A pair of cutters 66 are oppositely mounted within the hollow open chamber 14 of the support housing 12 to chop off excess of the unsupported lengths 22 of the cutting element 20.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A cord line mower which comprises:
   (a) a support housing having a hollow open chamber extending downwardly therefrom;
   (b) a plurality of wheels mounted to said housing to enable movement of said housing over a ground surface at a controlled height thereabove in a preferred direction;
   (c) a spool assembly within said housing;
   (d) a flexible non metallic cord line cutting element wound repeatedly within said spool assembly, said cutting element having two free unsupported lengths, each extending generally radially outward from an opposite side of said spool assembly during driven rotation thereof, the free unsupported lengths during cutting operations, define a plane substantially perpendicular to axis of rotation of said spool assembly to which the cutting element is wound thereto;

(e) a drive assembly for rotatably driving the spool assembly at a speed sufficient to extend and stiffen the lengthens of said cutting element to permit impact cutting of uncut grass particles thereby;

(f) a handle bar for manipulating said cord line mower; and (g) means for lifting said spool assembly into said drive assembly for extending the unsupported lengths of said cutting element thus releasing extra lengths of said cutting element, wherein said spool assembly includes:

(a) a cord line housing having a pair of opposite side holes therein;

(b) a spool within said cord line housing for holding said cutting element; and (c) a hollow shaft having an external bevel edge therearound, said shaft extends upwardly from said cord line housing; wherein said drive assembly includes:

(a) a casing mounted into said support housing;

(b) a motor mounted on said support housing, said motor having a vertical shaft extending downwardly into said casing;

(c) a first pulley wheel connected to the vertical shaft in said casing;

(d) a second pulley wheel rotatably mounted in said casing around said hollow shaft of said spool assembly; and (e) an endless belt placed around said first and second pulley wheels driven by said motor, wherein said lifting means includes:

(a) a plurality of rollers mounted to the top surface of said support housing;

(b) a plurality of eyelets mounted along said handle bar;

(c) a lever assembly mounted to upper portion of said handle bar;

(d) a spool lifter mounted to the underside of said cord line housing;

(e) an elongated cable affixed at one end to said spool lifter and extends upwardly through said hollow shaft over said rollers and through said eyelets with other end affixed to said lower assembly;

(f) said second pulley wheel having a cone shaped hole with a spring biased clutch mechanism therein so that when said lever assembly is manually activated said spool lifter will raise said cord line housing in which said bevel edge will engage with said clutch mechanism; and (g) at least one cutter mounted within the hollow open chamber of said support housing to chop off the excess of the unsupported lengths of the cutting element.

* * * * *